C. A. BEHLEN.
COUPLING AND DRAW BAR FOR TRAILERS.
APPLICATION FILED MAY 17, 1919.
1,313,452.
Patented Aug. 19, 1919.
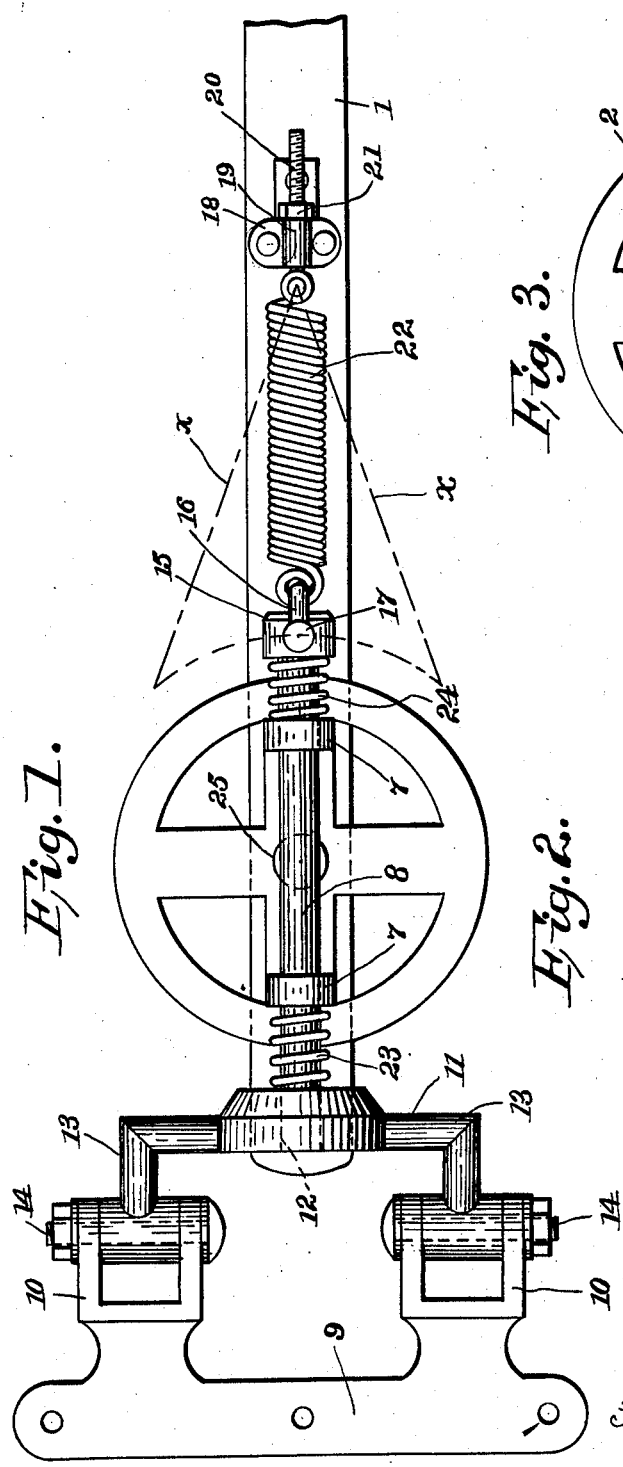
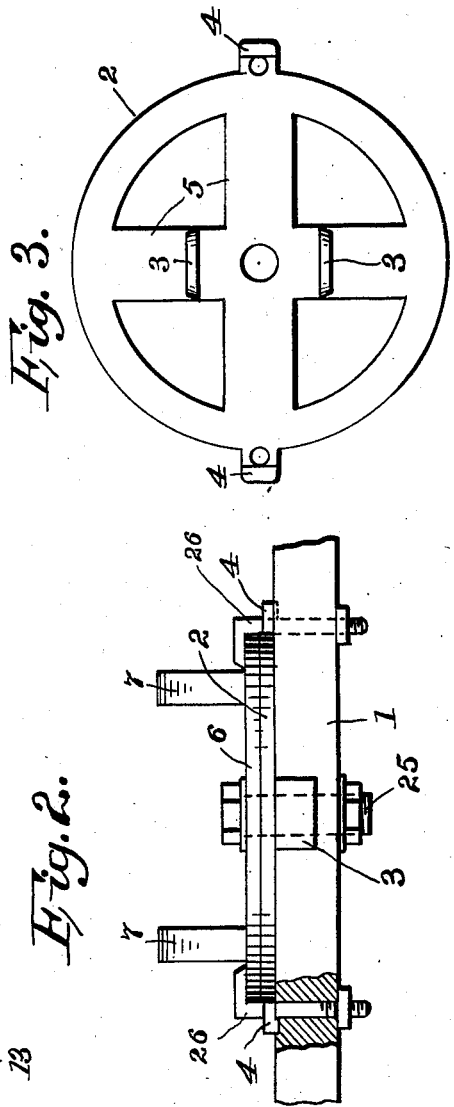

UNITED STATES PATENT OFFICE.

CHARLES A. BEHLEN, OF CINCINNATI, OHIO.

COUPLING AND DRAW-BAR FOR TRAILERS.

1,313,452.   Specification of Letters Patent.   Patented Aug. 19, 1919.

Application filed May 17, 1919. Serial No. 297,822.

*To all whom it may concern:*

Be it known that I, CHARLES A. BEHLEN, a citizen of the United States, residing at Cincinnati, in the county of Hamilton and State of Ohio, have invented certain new and useful Improvements in Couplings and Draw-Bars for Trailers; and I do hereby declare the following to be a full, clear, and exact description of the invention, such as will enable others skilled in the art to which it appertains to make and use the same.

The invention relates to the species of coupling and drawbar for trailers disclosed in my application for Letters Patent filed January 17, 1918, Serial No. 212,342, and comprises certain improvements thereon, especially as to the centering spring and the fifth wheel and its location relative to the part for coupling or attaching the device to the towing automobile or power vehicle.

The invention consists in certain novelties of construction and combinations of parts as herein set forth and pointed out in the claims.

The accompanying drawing shows an example of the embodiment of the invention, the pole being part of a trailer and the coupling adapted to be attached to a power vehicle, the same being constructed and the parts combined according to the best mode of procedure I have so far devised for the purpose.

Figure 1 is a top plan view of a trailer pole and the coupling and drawbar secured thereto.

Fig. 2 shows in side elevation the front end of the pole, the two members of the fifth wheel and the adjustable retaining hook bolts for holding the two members of the fifth wheel parallel under all conditions of service.

Fig. 3 is a bottom plan view of the lower member of the fifth wheel.

Referring to the figures, 1 designates the pole or part of a trailer; 2, the lower member of the fifth wheel circular in shape having lugs 3, 3 which bear against the side surfaces of the pole to prevent its turning, front and rear perforated lugs 4, 4, to receive the hook bolts 26, and connecting bars 5 which are united at the center and provided with a hole for a king bolt; 6, the upper fifth wheel member matching the lower member and provided wth a hole for the king bolt and two outwardly projecting lugs 7, 7 to receive the drawbar; 8 is the drawbar consisting of a rod or tube or bar located and movable within the perforations of the lugs 7, 7, as shown; 9, a perforated attaching device for connection with a power vehicle by bolts or other suitable means, the same constituting one part of the coupling proper, said device having two perforated ears 10 spaced apart a suitable distance; 11, the other part of the coupling proper consisting of a casting or forging having a hole 12 within which is secured the end of the drawbar, and two arms 13 perforated at the ends and matching the ears 10, 10; and 14, 14 are bolts loosely uniting the ears and arms so a joint or hinge will be formed allowing vertical movement of the parts of the coupling, the axis about which the coupling turns being in a horizontal line.

The end of the drawbar is threaded to receive a threaded nut 15, to which nut is pivotally attached a clevis 16 by means of a bolt 17 which may pass through the nut and a slot in the drawbar, or it may be otherwise attached to the nut. Upon the pole is secured by bolts an anchoring forging or casting 18 having a perforated lug 19 within which is located a threaded eye bolt 20. A take-up nut 21 is on the bolt back of the lug. To the eye bolt and the clevis 16 is secured at opposite ends a spring 22 which constitutes means for returning the drawbar to a position parallel with the pole after having been turned while passing a curved path.

A buffing spring 23 and a draw spring 24 are located on the drawbar between the lugs 7, 7 on the fifth wheel member and the coupling part 11 and nut 15. A king bolt 25 unites the two members of the fifth wheel and pole as shown.

Obviously, when the power vehicle enters a curved path the coupling, drawbar, and one member of the fifth wheel turn about the bolt 25 as a center and actuate the spring which takes the position shown by the dotted lines *x—x* in Fig. 1 as the drawbar is turned to the right or to the left. Upon passing from the curved path to a tangent the spring returns the drawbar substantially parallel with the pole. The hook bolts maintain the fifth wheel members parallel, an important function in preventing strains and wear of the parts. The presence of two arms in connecton with the coupling is likewise of importance in distributing the strains when the power vehicle enters a curved path, one arm being placed in tension and the other in compression.

The location of the king bolt on the pole and some distance from the power vehicle is also of importance to insure the perfect tracking of the trailer with the rear wheels of the power vehicle, for should the pivotal point be located near the power vehicle this result would not be secured. These new features simplify the construction, diminish the wear of the parts and generally improve the mode of operation.

What I claim is:

1. The combination in a coupling and drawbar for trailers, of a two-part jointed coupling; a fixed part of a trailer, as a pole; a fifth wheel member secured to the pole; a fifth wheel member having perforated lugs; a king bolt uniting the members of the fifth wheel and the pole; and a drawbar within the perforations of the lugs of one fifth wheel member and secured to one member of the coupling.

2. The combination in a coupling and drawbar for trailers, of a two-part jointed coupling; a fixed part of a trailer, as a pole; a fifth wheel member secured to the pole; a fifth wheel member having perforated lugs; a king bolt uniting the members of the fifth wheel and the pole; means for holding the two members of the fifth wheel parallel; and a drawbar within the perforations of the lugs of the fifth wheel members and secured to one member of the coupling.

3. The combination in a coupling and drawbar for trailers, of a two-part jointed coupling; a fixed part of a trailer, as a pole; a fifth wheel member secured to the pole; a fifth wheel member having a bearing for a drawbar; a king bolt uniting the members of the fifth wheel and the pole; means for holding the two fifth wheel members parallel consisting of an adjustable hook bolt; and a drawbar within the bearing of the fifth wheel member and secured to one member of the coupling.

4. The combination with a coupling and drawbar for trailers pivotally combined with a fixed part of a trailer, as a pole, of a spring secured to the drawbar at one end and the other end secured to the pole, the said spring normally holding the drawbar in line with the pole.

5. The combination in a coupling and drawbar for trailers, of a two-part jointed coupling; a fixed part of a trailer, as a pole; a fifth wheel member secured to the pole; a fifth wheel member having a bearing for a drawbar; a king bolt uniting the members of the fifth wheel and the pole; and a drawbar within the bearing in connection with one fifth wheel member and secured to one member of the coupling; said king bolt being located a suitable distance rearwardly of the coupling to cause the wheels of the trailer to follow the path of the rear wheels of the power vehicle when passing a curved path.

6. The combination in a coupling and drawbar for trailers, of a two-part coupling pivotally jointed in a horizontal line; a fixed part of a trailer, as a pole; a fifth wheel device supported by the pole; a drawbar connected to the movable member of the fifth wheel; and vertical pivotal means, as a bolt, connecting the fifth wheel device and pole at the rear of the coupling joint whereby the wheels of the trailers are caused to track with the rear wheels of the power vehicle.

7. The combination in a coupling and drawbar for trailers, of a two-part jointed coupling, a fixed part of a trailer, a fifth wheel member secured to the fixed part of the trailer, a fifth wheel member located and pivoted parallel with the other fifth wheel member, a drawbar carried by said latter member, and a spring for returning the drawbar and movable member to normal positions when displaced.

8. In a drawbar device, a fifth wheel member secured to a fixed part of a vehicle, a pivoted fifth wheel member matching the first mentioned fifth wheel member said pivoted member having a perforated bearing for a drawbar, a drawbar loosely located and rotatable within the bearing and provided at one end with means for its attachment, and spring means for returning the drawbar and movable fifth wheel member to normal positions when displaced.

In testimony whereof I affix my signature.

CHARLES A. BEHLEN.

Witnesses:
HENRY ORTON SARP,
WM. SEISER.

Copies of this patent may be obtained for five cents each, by addressing the "Commissioner of Patents, Washington, D. C."